United States Patent
Edström et al.

(10) Patent No.: US 11,601,974 B2
(45) Date of Patent: Mar. 7, 2023

(54) NETWORK NODE AND METHOD FOR PERFORMING MULTI-CHANNEL ACCESS PROCEDURES IN A LICENSE-ASSISTED ACCESS CELL IN WIRELESS COMMUNICATION NETWORK

(71) Applicant: Telefonaktiebolaget LM Ericsson (publ), Stockholm (SE)

(72) Inventors: Krister Edström, Hjärup (SE); Henrik Jeppsson, Lund (SE); Stefan Persson, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 16/765,535

(22) PCT Filed: Dec. 8, 2017

(86) PCT No.: PCT/EP2017/082080
§ 371 (c)(1),
(2) Date: May 20, 2020

(87) PCT Pub. No.: WO2019/110127
PCT Pub. Date: Jun. 13, 2019

(65) Prior Publication Data
US 2020/0322986 A1    Oct. 8, 2020

(51) Int. Cl.
*H04W 4/00* (2018.01)
*H04W 74/08* (2009.01)
*H04W 72/0446* (2023.01)

(52) U.S. Cl.
CPC ... *H04W 74/0808* (2013.01); *H04W 72/0446* (2013.01)

(58) Field of Classification Search
CPC .............. H04W 74/0808; H04W 72/0446
See application file for complete search history.

(56) References Cited

U.S. PATENT DOCUMENTS

| | | | |
|---|---|---|---|
| 2016/0143014 A1* | 5/2016 | Mukherjee | H04L 5/0007 370/330 |
| 2018/0192442 A1* | 7/2018 | Li | H04L 5/0048 |
| 2018/0213562 A1* | 7/2018 | Cierny | H04W 74/0808 |

FOREIGN PATENT DOCUMENTS

| WO | 2016162760 A1 | 10/2016 |
|---|---|---|
| WO | 2017051234 A1 | 3/2017 |

OTHER PUBLICATIONS

3GPP TSG RAN WG1 Meeting #86bis, "Discussion on UL Multi-carrier Transmission for eLAA", Oct. 10-14, 2016, R1-1610201 (Year: 2016).*

(Continued)

*Primary Examiner* — Siren Wei
(74) *Attorney, Agent, or Firm* — Coats & Bennett, PLLC

(57) ABSTRACT

A network node (120) and method therein for performing multi-channel access procedures in a License-Assisted Access, LAA, cell in a wireless communication network are disclosed. The network node selects one carrier as a master carrier and starts a Listen Before Talk, LBT, channel sensing for all carriers at a same or different point in time. The network node further stores LBT channel sensing results for all carriers for at least the last two slot durations of a subframe and checks if the LBT channel sensing on the master carrier is successful based on its LBT channel sensing result. When the LBT channel sensing on the master carrier is successful, the network node checks the LBT channel sensing results for all other carriers, and transmits on the master carrier and the carriers where the LBT channel sensing is successful at the subframe boundary or earlier than the subframe boundary. When the subframe boundary of the master carrier is reached and the LBT channel sensing on the master carrier is not successful, the network node transmits on the carriers where the LBT channel sensing is (Continued)

successful at the subframe boundary or earlier than the subframe boundary.

4 Claims, 6 Drawing Sheets

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Physical Layer Procedures (Release 13)", Technical Specification, 3GPP TS 36.213 V13.2.0, Jun. 1, 2016, pp. 1-381, 3GPP.

Wilus Inc., "Discussion on UL Multi-Carrier Transmission for eLAA", 3GPP TSG RAN WG1 Meeting #86bis, Lisbon, Portugal, Oct. 10, 2016, pp. 1-4, R1-1610201, 3GPP.

Wilus Inc., "Discussion on Handling UL Multicarrier Transmission Under UE Power Limited Case", 3GPP TSG RAN WG1 Meeting #86bis, Lisbon, Portugal, Oct. 10, 2016, pp. 1-5, R1-1610202, 3GPP.

Ericsson, "On Carrier Selection for LAA", 3GPP TSG RAN WG1 Meeting #80, Athens, Greece, Feb. 9, 2015, pp. 1-2, R1-150585, 3GPP.

\* cited by examiner

NETWORK NODE AND METHOD FOR PERFORMING MULTI-CHANNEL ACCESS PROCEDURES IN A LICENSE-ASSISTED ACCESS CELL IN WIRELESS COMMUNICATION NETWORK

TECHNICAL FIELD

Embodiments herein relate to a network node and method therein for performing multi-channel access procedures in a License-Assisted Access (LAA) cell in a wireless communication network. In particular, they relate to how to start multi-channel access procedures.

BACKGROUND

Wireless communication networks, such as Global System for Mobile Communications (GSM) networks, Wideband Code Division Multiple Access (WCDMA) or High Speed Packet Access (HSPA) networks, Long Term Evolution (LTE) networks, usually cover a geographical area which is divided into cell areas. Each cell area is served by a base station, which may also be referred as a network node, Base Station, an access node etc. A wireless communication network may include a number of cells that can support communications for a number of wireless communication devices or user equipment (UEs).

To allow LTE transmission in unlicensed bands, the 3rd Generation Partnership Project (3GPP) has introduced License-Assisted Access (LAA). LAA uses carrier aggregation in the downlink to combine LTE in unlicensed spectrum with LTE in the licensed band. LAA provides the usage of supplementary downlink carriers in unlicensed bands. In order to avoid interfering with ongoing transitions, like LAA or Wi-Fi, a procedure of evaluating a channel is performed, which is called channel access procedure or Listen Before Talk (LBT), and is described in detail by 3GPP.

To get high data rate, transmission should be performed on as many downlink carriers as possible. The carrier selection process is supported by the multiple channel access procedures for LAA defined by 3GPP, making it possible to get channel access to multiple unlicensed carriers simultaneously. Two different multicarrier channel access procedures, called Type A and Type B are described in the 3GPP specifications.

In Type A, a separate access procedure is performed for each carrier, and transmission is allowed on a carrier when the channel access procedure is successful for that specific carrier. There are no requirements on timing between transmission start on the different carriers.

In Type B, one carrier is selected as master carrier. If the channel access procedure is successful on the master carrier, only a short access procedure has to be performed on all other carriers called slave carriers. The short procedure shall be made just before starting the transmission on the master carrier. If the channel access procedure on the master is successful, transmission is allowed on the master as well as on the carriers where the shorter procedure is successful. If the channel access procedure on the master fails, none of the other carriers can be used for transmission.

When comparing the two types, Type B is better in the sense that it requires shorter time for evaluating the slave carriers, making it more likely to get channel access. However, it requires a successful evaluation on the master carrier. So a successful evaluation on the master carrier makes Type B better. On the other hand, an unsuccessful evaluation of the master carrier will prevent transmission on any carrier. Hence, Type A is a better choice, since the separate channel access procedure still might allow transmission on some of the other carriers.

This means that each procedure has a drawback. For Type A it is more difficult to get access to multiple carriers and for Type B there is a higher risk of not getting access to any carrier.

Further, in current solution, the choice of multiple channel access procedure, Type A or B, must be done before starting the procedure. This could imply a limitation to select the best carriers for transmission.

SUMMARY

It is therefore an object of embodiments herein to provide an improved method and apparatus for multiple channel access procedure in a LAA cell in a wireless communication network.

According to one aspect of embodiments herein, the object is achieved by a method performed in a network node for performing multi-channel access procedures in an LAA cell in a wireless communication network. The network node selects one carrier as a master carrier and starts an LBT channel sensing for all carriers at a same or different point in time. The network node stores LBT channel sensing results for all carriers for at least the last two slot durations of a subframe. The network node checks if the LBT channel sensing on the master carrier is successful based on its LBT channel sensing result. When the LBT channel sensing on the master carrier is successful, the network node checks the LBT channel sensing results for all other carriers, and transmits on the master carrier and the carriers where the LBT channel sensing is successful at the subframe boundary or earlier than the subframe boundary. When the subframe boundary of the master carrier is reached and the LBT channel sensing on the master carrier is not successful, the network node transmits on the carriers where the LBT channel sensing is successful at the subframe boundary or earlier than the subframe boundary.

According to one aspect of embodiments herein, the object is achieved by a network node for performing multi-channel access procedures in an LAA cell in a wireless communication network. The network node is configured to select one carrier as a master carrier and start an LBT channel sensing for all carriers at a same or different point in time. The network node is further configured to store LBT channel sensing results for all carriers for at least the last two slot durations of a subframe. The network node is further configured to check if the LBT channel sensing on the master carrier is successful based on its LBT channel sensing result. When the LBT channel sensing on the master carrier is successful, the network node is configured to check the LBT channel sensing results for all other carriers, and transmit on the master carrier and the carriers where the LBT channel sensing is successful at the subframe boundary or earlier than the subframe boundary. When the subframe boundary of the master carrier is reached and the LBT channel sensing on the master carrier is not successful, the network node is configured to transmit on the carriers where the LBT channel sensing is successful at the subframe boundary or earlier than the subframe boundary.

According to some embodiments, the starting time of the LBT channel sensing for all carriers may be selected to give a highest probability for successfully ending the LBT channel sensing on many channels at the same time and/or close to the subframe boundary.

In other words, according to the embodiments herein, both Type A and Type B access procedures are started simultaneously on all carriers, so it is possible to select the best channel access procedure when a transmission is about to start. If the channel access procedure is successful on the master carrier, Type B is selected, otherwise Type A is selected.

The embodiments herein make it possible to adapt the best channel access procedure and increase the possibility to get channel access for multiple carriers in an LAA multi-carrier transmission scenario, and hence increase LAA throughput in unlicensed bands.

Therefore, the embodiments herein provide an improved method and apparatus for multiple channel access procedure in an LAA cell in a wireless communication network.

BRIEF DESCRIPTION OF THE DRAWINGS

Examples of embodiments herein are described in more detail with reference to attached drawings in which.

DETAILED DESCRIPTION

Figure 1:
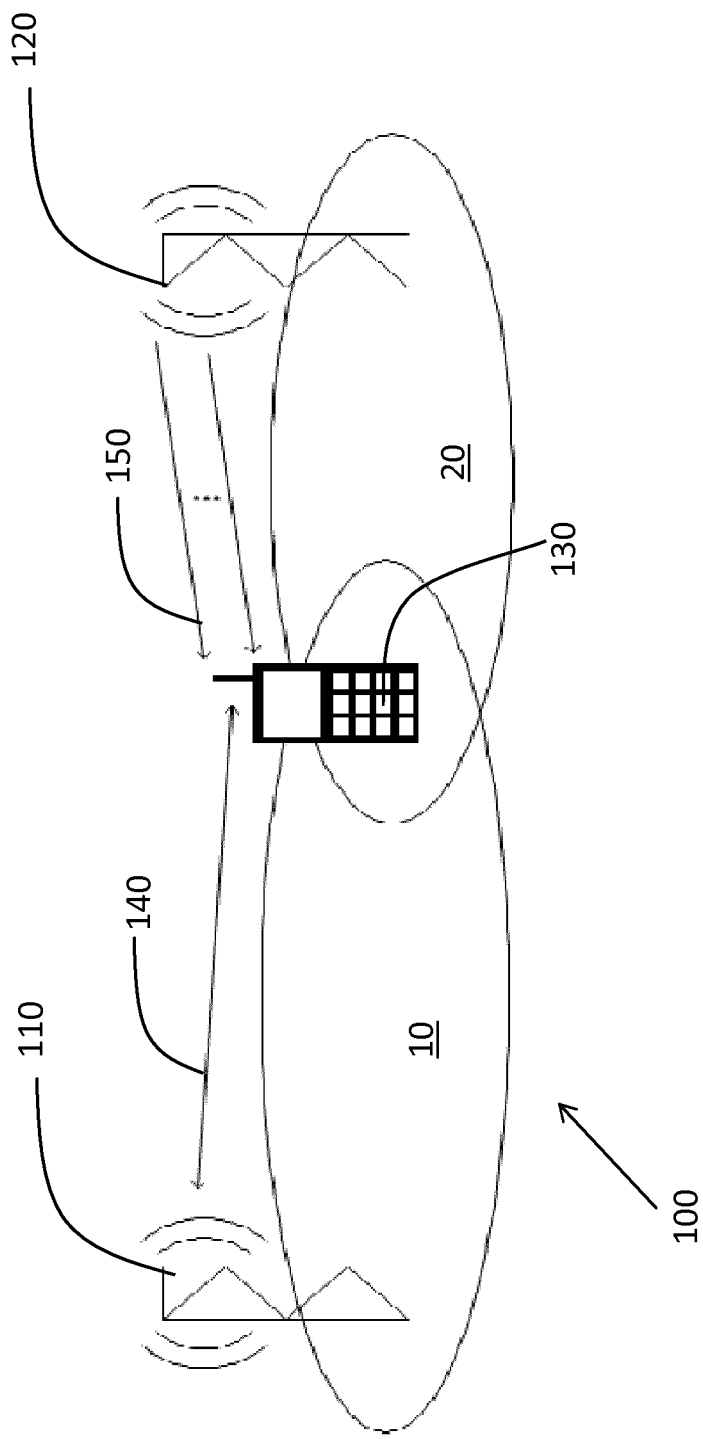
FIG. 1 is a schematic block diagram illustrating a wireless communication network.

FIG. 1 depicts an example of a wireless communication network 100 in which embodiments herein may be implemented. The wireless communication network 100 may be any wireless system or cellular network, such as a Long Term Evolution (LTE) network, any 3$^{rd}$ Generation Partnership Project (3GPP) cellular network, Worldwide interoperability for Microwave Access (WiMAX) network, Wireless Local Area Network (WLAN/Wi-Fi), a Fourth Generation (4G) or LTE advanced network, a Fifth Generation (5G) or New Radio (NR) network etc.

The wireless communication network 100 comprises a network node 110 which serves a primary cell 10 and is connected to an UE 130 in both uplink and downlink 140. One or several network nodes 120 at the same or different physical position as the primary cell 10, serves a secondary cell 20 on unlicensed spectrum which sends data via downlink 150 to the UE 130. In order to use the multiple downlink carriers in the downlink connection 150, a multi-channel access procedure for the carriers has to be performed.

Figure 2:
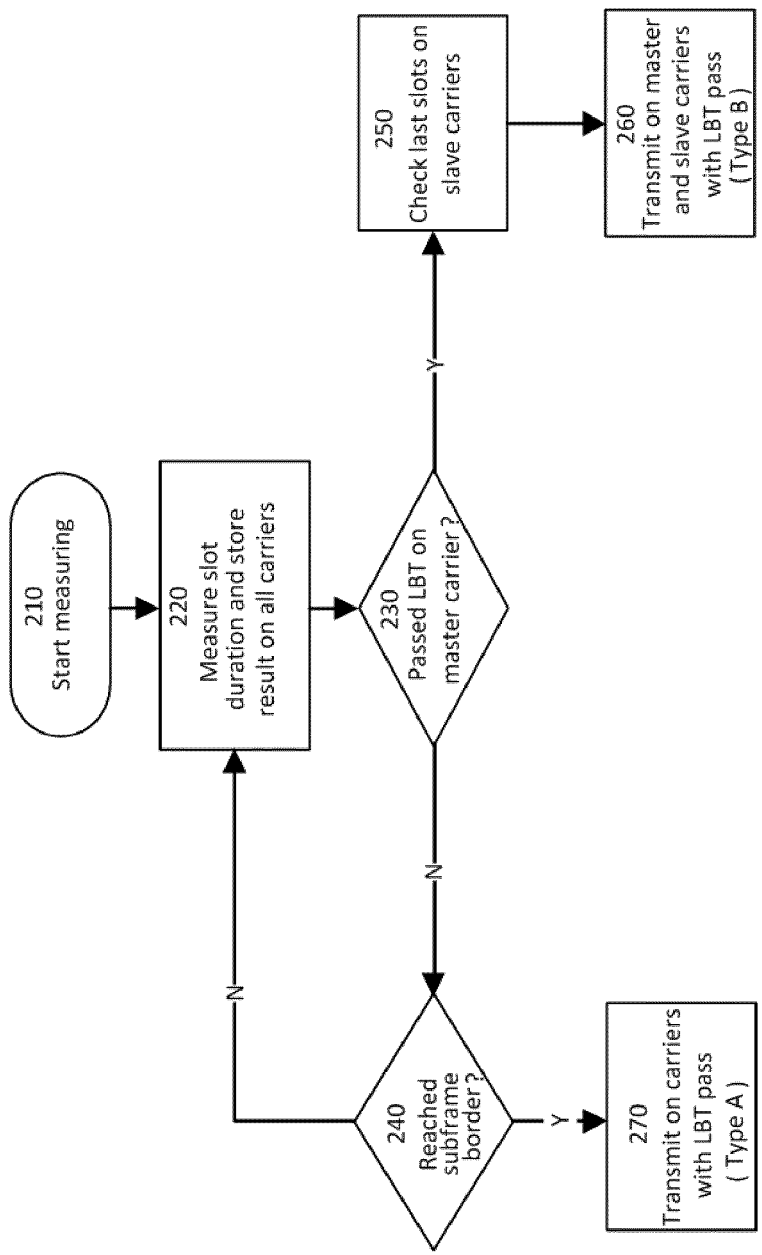
FIG. 2 is a flow chart illustrating a procedure of simultaneously starting LBT Type A and Type B channel access procedures according to embodiments herein.

FIG. 2 shows a procedure of simultaneously starting LBT Type A and Type B channel access procedures.

In step 210, the network nodes in cells with unlicensed spectrum start a channel access procedure or an LBT channel sensing, for all carriers at same or different point in time. The measuring method may be Carrier Sensing (CS). In CS technology, the device measures the energy, such as RSSI, level in the channel and compares the measured RSSI value with a specified value, i.e. threshold value.

When starting, one carrier should be selected as master channel, following the 3GPP specifications for Type B multi-channel access procedure.

The starting times for measures may be selected to give highest probability for ending the procedures for all carriers at the same time and/or close to the next sub-frame border.

In step 220, the network node measures for slot durations of the LBT observation time which shall be not less than, e.g. 15 μs on its operating channel. The channel sensing results from at least the last two slot durations, e.g. 9 μs, are stored for all carriers. For example, the network node may store results per slot occasion on each slave carrier parallel to the result on the master carrier during the last 25 us.

In step 230, the network node checks if the LBT procedure passes on the master carrier. The channel shall be considered occupied if the energy level in the channel exceeds a predefined threshold. The energy detection threshold varies depending on the transmit power of a transmitter. It has a lower and upper limit, and between the limits it linearly decreases with increased transmit power.

In step 240, if the channel access procedure fails on the master carrier, the network node checks if the subframe border is reached. If the subframe border is not reached, the channel access procedures continue on other carriers either until a pass is achieved on the master carrier, or the subframe boundary is crossed.

In step 250, if the channel procedure on the master carrier is successful, Type B is selected, and the stored measuring values of the at least two last slots are checked.

In step 260, for the master carrier, and the carriers where the stored measuring results fulfil channel access requirement for Type B, transmission may be started at the subframe boundary or earlier.

In step 270, if the subframe boundary is reached without successful channel procedure on the master carrier, Type A is used. Transmission may be started on the carriers fulfilling access requirement for Type A, at the subframe boundary.

Figure 3:
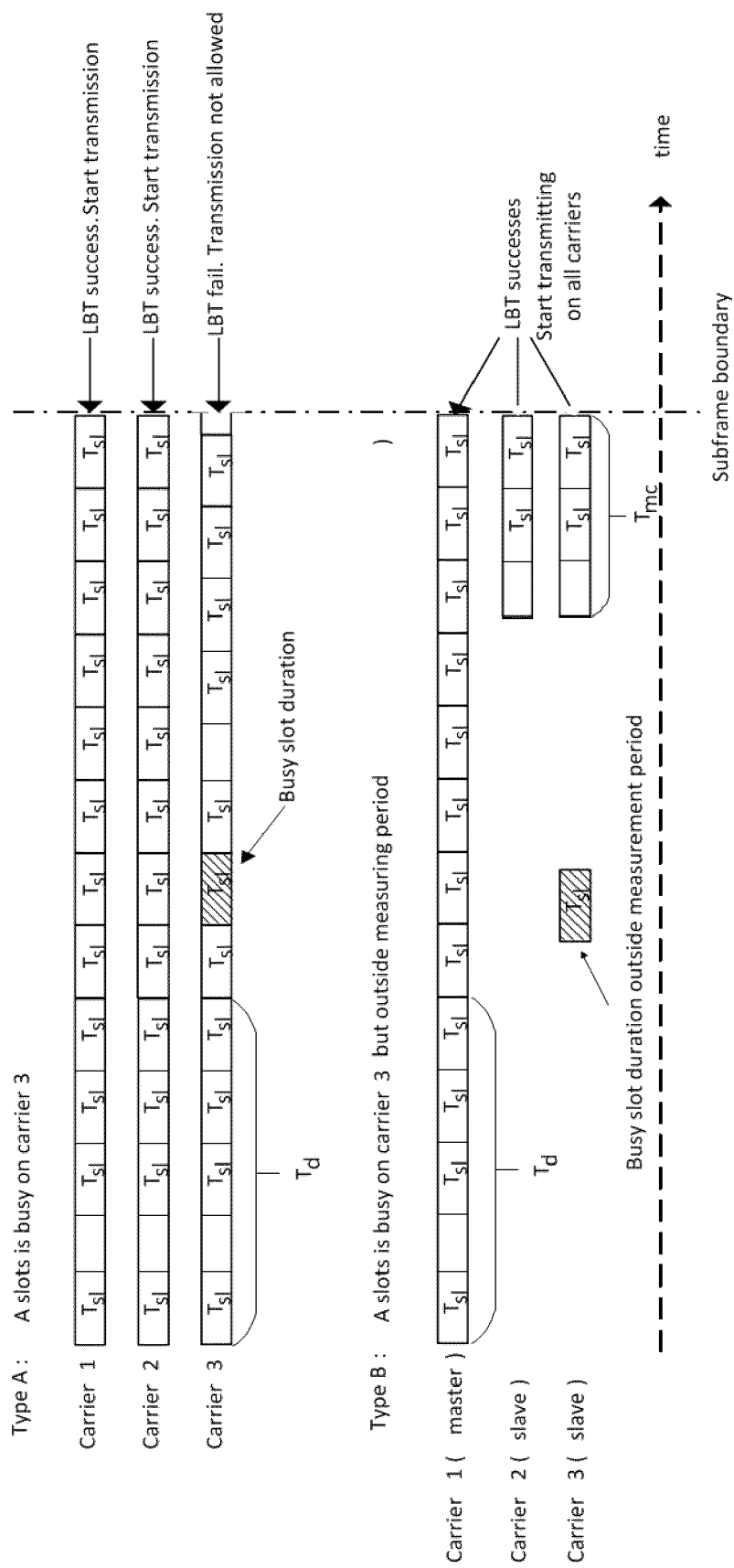
FIG. 3 is a diagram depicting an example scenario where Type B procedure is preferred.

FIG. 3 shows an example where Type B is to prefer since all carriers pass the channel access procedure. This happens, e.g., when a slot is busy for one of the slave carriers but is busy earlier in the LBT procedure. As shown in FIG. 3, one slot in the middle of a subframe in carrier 3 is busy but outside the measuring period. When checking the measuring results of the last two slots, carrier 3 is not busy. So all carriers 1, 2, 3 have passed the LBT channel sensing, transmissions may start on all 3 carriers. If only Type A channel access procedure is chosen, LBT channel sensing on carrier 3 fails, transmission is not allowed on this carrier.

Figure 4:
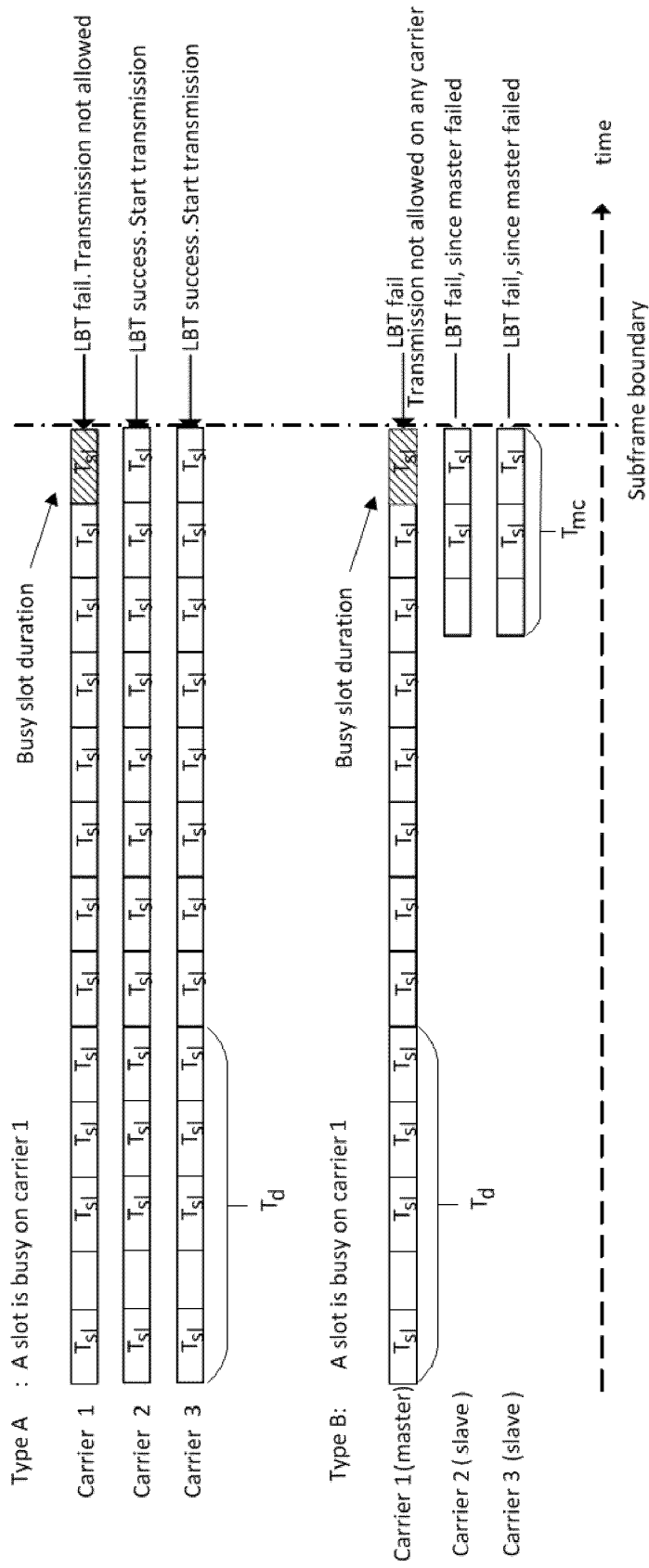
FIG. 4 is a diagram depicting an example scenario where Type A procedure is preferred.

FIG. 4 shows another example where Type A is beneficial. This happens when the master carrier fails the channel access procedure before transmission, then no carriers are available for transmission for Type B. However, For Type A, two of the carriers are available. As shown in FIG. 4, the last slot of a subframe in carrier 1 is busy, which is the master carrier. If only Type B channel access procedure is used, when LBT fails on the master carrier, transmission is not allowed on any carrier. However, when Type A is also used, although LBT procedure fails on carrier 1, transmission is not allowed only on this carrier, transmission may start on other carriers, e.g. carriers 2 and 3, where LBT procedures succeed.

Figure 5:
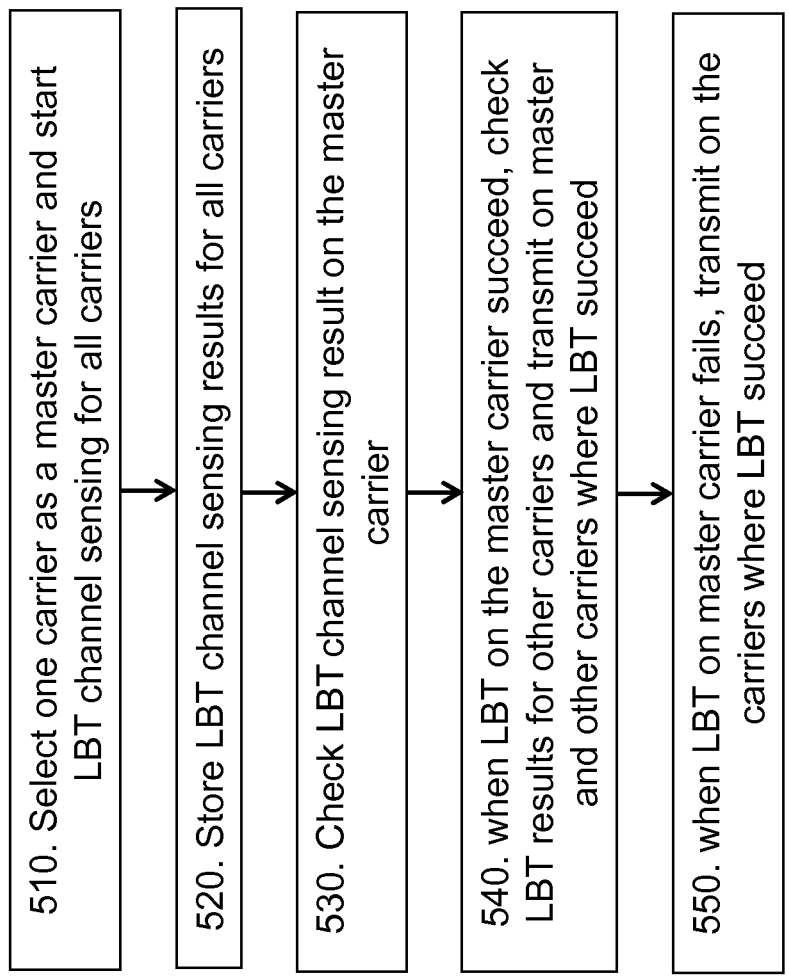
FIG. 5 is a flowchart illustrating a method performed in a network node according to embodiments herein.

Example of embodiments of a method performed in a network node 120 for performing multi-channel access procedures in an LAA cell in a wireless communication network 100 will now be described with reference to FIG. 5. The network node 120 may be any one of a base station an access node, UE or mobile device etc. The method comprises the following actions.

Action 510

The network node 120 selects one carrier as a master carrier and starts an LBT channel sensing for all carriers at a same or different point in time.

Action 520

The network node 120 stores LBT channel sensing results for all carriers for at least the last two slot durations of a subframe.

Action 530

The network node 120 checks if the LBT channel sensing on the master carrier is successful based on its LBT channel sensing result.

Action 540

When the LBT channel sensing on the master carrier is successful, the network node 120 checks the LBT channel sensing results for all other carriers, and transmits on the master carrier and the carriers where the LBT channel sensing is successful at the subframe boundary or earlier than the subframe boundary.

Action 550

When the subframe boundary of the master carrier is reached and the LBT channel sensing on the master carrier is not successful, the network node 120 transmits on the carriers where the LBT channel sensing is successful at the subframe boundary or earlier than the subframe boundary.

Figure 6:
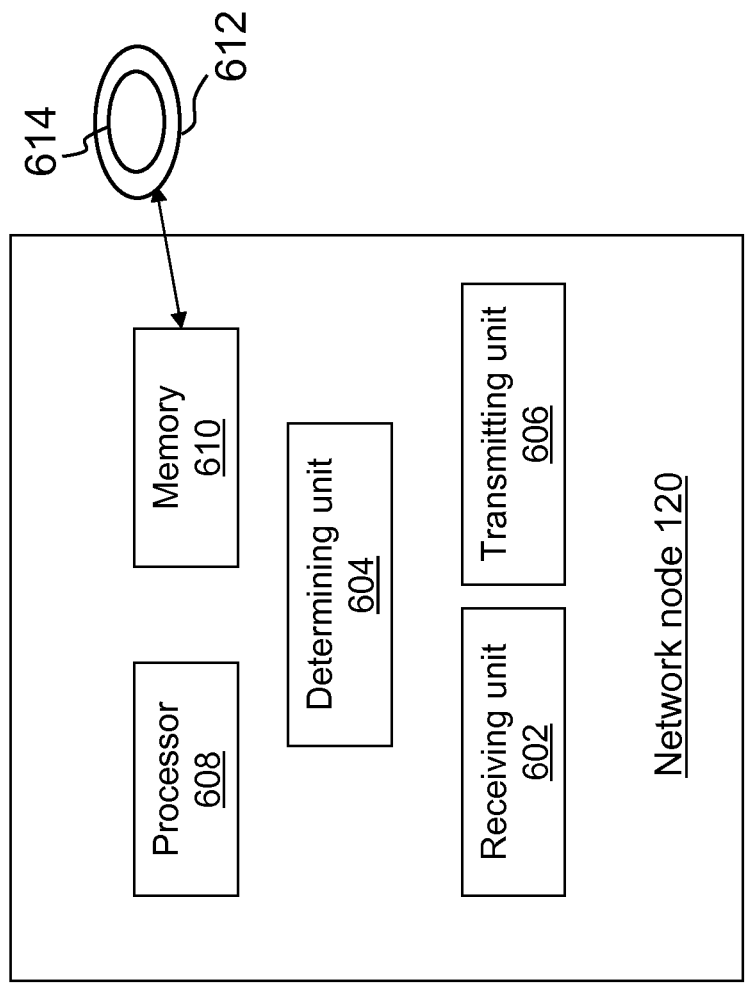
FIG. 6 is a schematic block diagram illustrating embodiments of a network node.

To perform the method actions in the network node 120 for performing multi-channel access procedures in an LAA cell in a wireless communication network 100, the network node 120 comprises circuits or units as depicted in FIG. 6. The network node 120 comprises e.g. a receiving unit 602, a determining unit 604, a transmitting unit 606, a processor 608 and a memory 610.

According to the embodiments herein, the network node 120 is configured to, e.g. by means of the determining unit 604 being configured to, select one carrier as a master carrier and start an LBT channel sensing for all carriers at a same or different point in time.

According to the embodiments herein, the network node 120 is further configured to, e.g. by means of the receiving unit 602 being configured to, store LBT channel sensing results for all carriers for at least the last two slot durations of a subframe.

According to the embodiments herein, the network node 120 is further configured to, e.g. by means of the determining unit 604 being configured to, check if the LBT channel sensing on the master carrier is successful based on its LBT channel sensing result.

According to the embodiments herein, when the LBT channel sensing on the master carrier is successful, the network node 120 is further configured to, e.g. by means of the determining unit 604 being configured to, check the LBT channel sensing results for all other carriers, and is configured to, e.g. by means of the transmitting unit 606 being configured to, transmit on the master carrier and the carriers where the LBT channel sensing is successful at the subframe boundary or earlier than the subframe boundary.

According to the embodiments herein, when the subframe boundary of the master carrier is reached and the LBT channel sensing on the master carrier is not successful, the network node 120 is configured to, e.g. by means of the transmitting unit 606 being configured to, transmit on the carriers where the LBT channel sensing is successful at the subframe boundary or earlier than the subframe boundary.

In summary, according to the embodiments herein, both Type A and Type B access procedures are started simultaneously on all carriers, so it is possible to select the best channel access procedure when a transmission is about to start. If the channel access procedure is successful on the master carrier, Type B is selected, otherwise Type A is selected.

The embodiments herein make it possible to adapt the best channel access procedure and increase the possibility to get channel access for multiple carriers in an LAA multi-carrier transmission scenario, and hence increase LAA throughput in unlicensed bands.

Therefore, the embodiments herein provide an improved method and apparatus for multiple channel access procedure in an LAA cell in a wireless communication network.

Those skilled in the art will appreciate that the receiving unit 602, the determining unit 604 and the transmitting unit 606 described above in the network node 120 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for evaluating a channel in an LAA cell in the wireless communication network 100 may be implemented through one or more processors, such as the processor 608 in the network node 120 together with computer program code for performing the functions and actions of the embodiments herein. The program code mentioned above may also be provided as a computer program product, for instance in the form of a data carrier 612 carrying computer program code 614, as shown in FIG. 6, for performing the embodiments herein when being loaded into the network node 120. One such carrier may be in the form of a CD ROM disc. It is however feasible with other data carriers such as a memory stick. The computer program code may furthermore be provided as pure program code on a server and downloaded to the network node 120.

The memory 610 in the network node 120 may comprise one or more memory units and may be arranged to be used to store received information, measurements, data, configurations and applications to perform the method herein when being executed in the network node 120.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method, in a network node, for performing multi-channel access procedures in a License-Assisted Access (LAA) cell in a wireless communication network; the method comprising the network node:
   selecting one of a plurality of carriers as a master carrier;
   starting both Type A and Type B access procedures simultaneously on all of the carriers, the access procedures comprising Listen Before Talk (LBT) channel sensing for each of the carriers, wherein:
      for the Type A access procedures, the LBT channel sensing starts for all of the carriers at a same time;

for the Type B access procedures, the LBT channel sensing starts for the master carrier and at least one other of the carriers at different times; and for both the Type A and Type B procedures, the LBT channel sensing is performed for all carriers until a given subframe boundary is reached and for at least two slot durations previous to the subframe boundary; and transmitting on each carrier for which the LBT channel sensing is successful according to any of the access procedures.

2. The method of claim 1, wherein the starting points in time of the LBT channel sensing for all carriers are selected to give a highest probability for successfully ending the LBT channel sensing on many channels at, or within one subframe of, the subframe boundary.

3. A network node for performing multi-channel access procedures in a License-Assisted Access (LAA) cell in a wireless communication network, the network node comprising:

processing circuitry;

memory containing instructions executable by the processing circuitry whereby the network node is operative to:

select one of a plurality of carriers as a master carrier;

starting both Type A and Type B access procedures simultaneously on all of the carriers, the access procedures comprising Listen Before Talk (LBT) channel sensing for each of the carriers, wherein:

for the Type A access procedures, the LBT channel sensing starts for all of the carriers at a same time;

for the Type B access procedures, the LBT channel sensing starts for the master carrier and at least one other of the carriers at different times; and for both the Type A and Type B procedures, the LBT channel sensing is performed for all carriers until a given subframe boundary is reached and for at least two slot durations previous to the subframe boundary; and transmitting on each carrier for which the LBT channel sensing is successful according to any of the access procedures.

4. The network node of claim 3, wherein starting points in time of the LBT channel sensing for all carriers are selected to give a highest probability for successfully ending the LBT channel sensing on many channels at, or within one subframe of, the subframe boundary.

* * * * *